United States Patent
Aso

(10) Patent No.: US 7,937,211 B2
(45) Date of Patent: May 3, 2011

(54) INTERNAL COMBUSTION ENGINE TORQUE CONTROL

(75) Inventor: Koji Aso, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/530,517

(22) PCT Filed: Mar. 7, 2008

(86) PCT No.: PCT/IB2008/000534
§ 371 (c)(1),
(2), (4) Date: Sep. 9, 2009

(87) PCT Pub. No.: WO2008/110889
PCT Pub. Date: Sep. 18, 2008

(65) Prior Publication Data
US 2010/0108028 A1 May 6, 2010

(30) Foreign Application Priority Data
Mar. 9, 2007 (JP) .................................. 2007-059721

(51) Int. Cl.
*F02P 5/00* (2006.01)
*F02D 11/10* (2006.01)
(52) U.S. Cl. .................... 701/110; 123/399; 123/406.25; 123/406.51
(58) Field of Classification Search .................. 701/103, 701/110; 123/399, 406.23, 406.24, 406.25, 123/406.36, 406.5, 406.52, 492, 493
See application file for complete search history.

(56) References Cited

U.S. PATENT DOCUMENTS

| | | | |
|---|---|---|---|
| 6,202,630 B1 | 3/2001 | Yip | |
| 6,631,319 B1 * | 10/2003 | Luh | 701/54 |
| 2004/0107034 A1 | 6/2004 | Togai et al. | |
| 2010/0100263 A1 * | 4/2010 | Aoki et al. | 701/22 |
| 2010/0241335 A1 * | 9/2010 | Aso | 701/103 |

FOREIGN PATENT DOCUMENTS

| | | |
|---|---|---|
| DE | 101 19 724 | 2/2003 |
| EP | 1 028 242 | 8/2000 |
| JP | 5 321803 | 12/1993 |

* cited by examiner

*Primary Examiner* — Hai H Huynh
(74) *Attorney, Agent, or Firm* — Oblon, Spivak, McClelland, Maier & Neustadt, L.L.P.

(57) ABSTRACT

In a control device for an internal combustion engine including a throttle valve for adjusting the intake air amount that affects on the torque of the internal combustion engine, when a request for acceleration of the internal combustion engine is made, a torque gradient, which is a change in the torque of the internal combustion engine per unit time during the acceleration, is predicted based on an operating condition of the internal combustion engine before the acceleration, and the operation of the throttle valve is controlled based on the predicted torque gradient during the acceleration of the internal combustion engine.

19 Claims, 12 Drawing Sheets

INTERNAL COMBUSTION ENGINE TORQUE CONTROL

FIELD OF THE INVENTION

The present invention relates to control a device and method for controlling an internal combustion engine to control the torque during acceleration.

BACKGROUND OF THE INVENTION

A conventional ignition timing control device for an internal combustion engine retards the ignition timing when acceleration of an internal combustion engine is detected and then controls the ignition timing when the change in the rotational speed of the internal combustion engine reaches a positive value such that the torque will have a phase opposite to that of the acceleration vibration phase in order to prevent an acceleration shock (see Japanese Patent Application Publication No. 5-321803 (JP-A-5-321803)).

The change in torque of an internal combustion engine per unit time when accelerating (which may be hereinafter referred to as "torque gradient") has a large effect on shock, which occurs during acceleration (which may be hereinafter referred to as "acceleration shock"), or the acceleration performance. The above device causes the torque to have a phase opposite to the acceleration vibration phase during acceleration to prevent an acceleration shock. However, the device does not control the torque based on the torque gradient during acceleration and thus may excessively decrease the torque. In this case, the torque increases slowly during acceleration and the increase in torque is gentle, resulting in low acceleration performance.

SUMMARY OF THE INVENTION

The present invention provides a control device and a method for controlling an internal combustion engine that controls the torque of an internal combustion engine during acceleration to achieve a rapid increase in the torque and to prevent acceleration shock caused by acceleration.

A first aspect of the present invention relates to an internal combustion engine control device that includes parameter adjusting means for adjusting a parameter that affects the torque generated by the internal combustion engine. The control device includes: torque gradient prediction means that predicts, when a request for acceleration of the internal combustion engine is made, a torque gradient, which is a change in the torque of the internal combustion engine per unit time, during the acceleration based on an operating condition of the internal combustion engine before the acceleration, and operation control means for controlling the operation of the parameter adjusting means during the acceleration of the internal combustion engine based on the torque gradient predicted by the torque gradient prediction means.

If the torque is increased rapidly, that is, the rise in torque is sharp when the torque gradient during acceleration is large, a large acceleration shock tends to occur. However, if an acceleration shock is prevented when the torque gradient during acceleration is small, the increase in torque will be slow and the rise in torque will be gentle. The torque gradient affects the increase in torque and the acceleration shock. According to the control device of the present invention, a torque gradient is predicted before acceleration and the operation of the parameter adjusting means is controlled based on the predicted torque gradient so that the torque gradient during the acceleration will be a torque gradient that does not cause acceleration shock and provides the fastest increase in torque. Thus, the torque during acceleration may be controlled appropriately. As a result, acceleration shock is prevented and a rapid increase in torque may be achieved simultaneously.

The parameter may be the intake air amount and the parameter adjusting means may a throttle valve. If the torque gradient predicted by the torque gradient prediction means is equal to or below a predetermined value, the operation control means may temporarily control the throttle valve to initially reduce the throttle-opening amount at start of the acceleration of the internal combustion engine and increase the throttle opening amount. When the throttle-opening amount is reduced, the intake pressure downstream of the throttle valve decreases. Thus, by temporarily reducing the throttle-opening amount and then subsequently increasing it, a greater amount of intake air is introduced into the combustion chamber when the throttle-opening amount is subsequently increased and the torque may be rapidly increased during acceleration. Because the control is executed to close the throttle valve temporarily when the predicted torque gradient is smaller than a predetermined permissible value, that is, when the torque gradient can be increased, a sharp increase in torque may be achieved and the acceleration performance is improved. In addition, by appropriately setting the predetermined permissible value, acceleration shock is prevented In temporarily reducing the throttle-opening amount during the acceleration of the internal combustion engine, the operation control means may close the throttle valve to an idle opening amount, which is the opening amount set when the internal combustion engine is idling. In general, a minimum throttle opening at which the internal combustion engine can continue running is set as the idle opening amount. Thus, by temporarily reducing the throttle-opening amount, the intake pressure downstream of the throttle valve may be rapidly decreased without stalling the internal combustion engine.

The control device may further include minimum throttle opening amount setting means for setting a minimum throttle opening amount based on the difference between the torque gradient predicted by the torque gradient prediction means and the predetermined value. In temporarily reducing the throttle opening amount during the acceleration of the internal combustion engine, the operation control means may close the throttle valve to the minimum throttle opening amount. In this case, because the minimum opening is set based on the difference between the torque gradient during acceleration and the predetermined value, it is possible to prevent the throttle opening amount from being unnecessarily reduced during the acceleration of the internal combustion engine. Thus, the throttle valve may be rapidly opened and the torque of the internal combustion engine may be rapidly increased.

The parameter may be the intake air amount and the parameter adjusting means may a throttle valve. The control device may further include target throttle opening amount setting means which, when a request for acceleration of the internal combustion engine is made, sets a target throttle opening amount that is an opening amount of the throttle valve at the end of the acceleration. When the torque gradient predicted by the torque gradient prediction means is greater than a predetermined value, the operation control means may first hold the throttle valve temporarily at a first intermediate throttle opening amount which is greater than the opening amount at the start of the acceleration and smaller than the target throttle opening amount and then opens the throttle valve during the acceleration of the internal combustion engine. By temporarily holding the throttle valve at the first intermediate throttle opening amount, the pressure difference between upstream and downstream of the throttle valve is decreased and the degree of increase in the intake air as the throttle valve is opened may be decreased appropriately, whereby the torque gradient is decreased appropriately. Thus, by appropriately setting the predetermined value, acceleration shock may be prevented. In addition, by appropriately setting the first intermediate throttle opening amount, an unnecessary limitation of the intake air amount may be prevented and the torque may be increased rapidly during acceleration.

The torque gradient prediction means may have interim torque gradient prediction means for predicting a torque gradient that will be obtained when the throttle valve is adjusted from the first intermediate throttle opening amount to the target throttle opening amount while the throttle valve is being held at the first intermediate throttle opening amount. When the torque gradient predicted by the interim torque gradient prediction means is greater than the predetermined value, the operation control means may hold the throttle valve temporarily at a second intermediate throttle opening amount, which is greater than the first intermediate throttle opening amount and smaller than the target throttle opening amount, before adjusting the throttle valve to the target throttle opening amount. By predicting a torque gradient while the throttle valve is held at the first intermediate throttle opening amount and holding the throttle valve temporarily at the second intermediate throttle opening amount based on the result of the prediction as described above, occurrence of acceleration shock is more reliably prevented.

The internal combustion engine may be a spark ignition internal combustion engine. The parameter may be ignition timing and the parameter adjusting means may be ignition means. If the torque gradient predicted by the torque gradient prediction means is greater than a predetermined value, the operation control means may control the operation of the ignition means such that the ignition timing is retarded in accordance with the difference between the torque gradient predicted by the torque gradient prediction means and the predetermined value. Conventionally, when the ignition timing is retarded, the torque of the internal combustion engine decreases. Thus, by appropriately setting the predetermined value, acceleration shock is prevented and a rapid increase in torque during acceleration is also achieved in this embodiment.

The operation control means may control the operation of the ignition means such that the ignition timing is further retarded as the difference between the torque gradient predicted by the torque gradient prediction means and the predetermined value increases. By retarding the ignition timing as described above, it is possible to prevent the torque of the internal combustion engine from being decreased unnecessarily during acceleration. As a result, the torque may be increased rapidly during acceleration.

The internal combustion engine may be mounted in a vehicle. The control device may further include acceleration rate detection means for detecting a rate of acceleration in the longitudinal direction of the vehicle. The operation control means may include storage means for storing a map of the relation between the torque gradient predicted by the torque gradient prediction means and the extent to which the operation control means controls the parameter adjusting means during acceleration of the internal combustion engine, and correction means that corrects the map stored in the storage means based on the rate of acceleration detected by the acceleration rate detection means during the acceleration, when the operation control means controls the operation of the parameter adjusting means based on the torque gradient predicted by the torque gradient prediction means during acceleration of the internal combustion engine. By correcting the map based on an actual rate of acceleration of the vehicle obtained when the operation of the parameter adjusting means is controlled, that is, making the operation control means to learn from the process, as described above, the torque of the internal combustion engine may be controlled more appropriately during any subsequent acceleration.

The control device may further include torque acquisition means for acquiring torque of the internal combustion engine. The torque gradient prediction means may predict a torque gradient based on the operating amount of the accelerator pedal of the internal combustion engine at a time when the request for acceleration of the internal combustion engine is made and the torque acquired by the torque acquisition means when the request for acceleration of the internal combustion engine is made. The torque gradient during acceleration is affected by the operating conditions of the internal combustion engine before the acceleration, and especially affected by the torque of the internal combustion engine before the acceleration. Generally, because the maximum torque of an internal combustion engine is a fixed value, the lower the torque is before acceleration, the greater the degree that the torque may be increased during the acceleration. Also, the lower the torque is before acceleration, the more additional power the internal combustion engine can output. Thus, the lower the torque before acceleration is, the more easily the torque of the internal combustion engine may be increased during the acceleration. That is, the lower the torque before acceleration is, the larger the torque gradient will be. Also, the torque gradient during acceleration is affected by the operating amount of the accelerator pedal. For example, the greater the operating amount of the accelerator pedal, the larger the degree of torque to be increased during acceleration is and the larger the torque gradient will be. The torque gradient during acceleration is correlated with the torque and the operating amount of the accelerator pedal before the acceleration as described above. Thus, the torque gradient can be predicted based on the torque and the operating amount of the accelerator pedal before the acceleration.

The control device may further include intake pressure acquisition means for acquiring an intake pressure of the internal combustion engine. The torque gradient prediction means may estimate the intake pressure of the internal combustion engine at the end of the acceleration based on the operating amount of the accelerator pedal when the request for acceleration of the internal combustion engine was made, and predict a torque gradient based on the estimated intake pressure and the intake pressure acquired by the intake pressure acquisition means when the request for acceleration of the internal combustion engine is made. It is believed that the greater the difference between the estimated intake pressure at the end of acceleration and the intake pressure before the acceleration is, the greater the degree of the torque to be increased during the acceleration is. Thus, as in the case with the operating amount of the accelerator pedal described above, it may be predicted that the greater the difference between the estimated intake pressure at the end of acceleration and the intake pressure before the acceleration, the larger the torque gradient during acceleration will be. Therefore, the torque gradient is predicted based on the estimated intake pressure at the end of acceleration and the intake pressure before the acceleration.

The internal combustion engine may be mounted in a vehicle. The control device may further include acceleration rate detection means for detecting a rate of acceleration in the longitudinal direction of the vehicle. The torque gradient prediction means may predict a torque gradient based on the operating amount of the accelerator pedal when the request for acceleration of the internal combustion engine is made and a rate of acceleration detected by the acceleration rate detection means when the request for acceleration of the internal combustion engine is made. When the rate of acceleration of the vehicle is large before acceleration, it can be estimated that the engine is already running at a high rotational speed and high output. In this case, it is believed that the internal combustion engine cannot output additional power, and the torque gradient during acceleration will be small. Because the rate of acceleration of the vehicle before acceleration is correlated with the torque gradient, the torque gradient may be predicted based on the rate of acceleration of the vehicle before the acceleration.

A second aspect of the present invention relates to a method of controlling an internal combustion engine. The control method includes the steps of: predicting a torque gradient when a request for acceleration of the internal combustion engine is made, which is a change in the torque of the internal combustion engine per unit time during the acceleration, based on an operating condition of the internal combustion engine before the acceleration, and adjusting a parameter that affects on the torque of the internal combustion engine based on the predicted torque gradient during the acceleration of the internal combustion engine.

As described above, according to the control device and control method of the present invention, a torque gradient during acceleration is predicted and a parameter is controlled based on the predicted torque gradient during the acceleration. Thus, the torque during acceleration is appropriately controlled. At this time, the operation of the parameter adjusting means is controlled such that the torque gradient during acceleration can be a torque gradient that does not cause acceleration shock and provides the quickest increase in torque. As a result, acceleration shock may be prevented and torque may be rapidly increased during acceleration.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
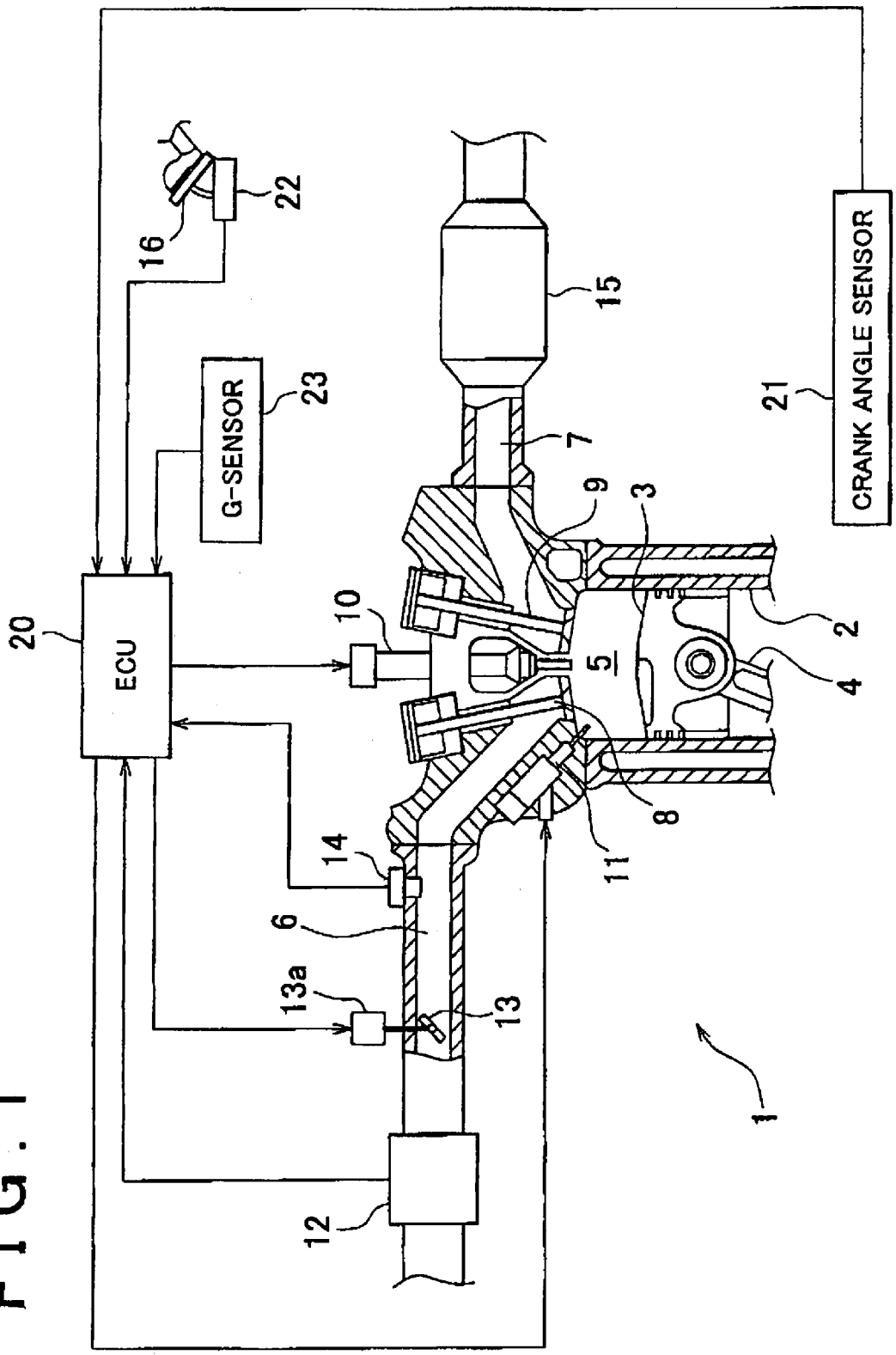
FIG. 1 a view illustrating an internal combustion engine that incorporates a control device according to a first embodiment of the present invention.

FIG. 1 shows an internal combustion engine in which a control device according to a first embodiment of the present invention is incorporated. The internal combustion engine (which may be hereinafter referred to as "engine") 1 shown in FIG. 1 is an engine mounted in a vehicle as a driving power source and has a plurality of cylinders 2. Although only one of the cylinders 2 is shown in FIG. 1, the other cylinders 2 have the same configuration. A piston 3 is reciprocably received in each cylinder 2, and the piston 3 is connected to a crankshaft (not shown) via a connecting rod 4. A combustion chamber 5 is formed between the upper end of the cylinder 2 and the top of the piston 3, and an intake passage 6 and an exhaust passage 7 are connected to the combustion chamber 5. Communication between the intake passage 6 and the combustion chamber 5 is opened and closed by intake valves 8, and communication between the exhaust passage 7 and the combustion chamber 5 is opened and closed by exhaust valves 9. The intake valves 8 and the exhaust valves 9 are opened and closed by a valve driving mechanism (not shown). A spark plug 10, which serves as an ignition means, is provided generally at the center of the upper end of the combustion chamber 5, and an fuel injector 11 for injecting fuel into the cylinder 2 is provided on the outer side of the intake valves 8. That is, the engine 1 is a spark ignition internal combustion engine. An airflow meter 12 for outputting a signal corresponding to the amount of intake air, a throttle valve 13 for adjusting the amount of intake air, and an intake pressure sensor 14 as intake pressure acquisition means for outputting a signal corresponding to the intake pressure are provided in the intake passage 6. The throttle valve 13 may be an electronically controlled throttle valve, which can be adjusted to a designated opening by an actuator 13a. An exhaust gas purification catalyst 15 is provided in the exhaust passage 7. As the exhaust gas purification catalyst 15, a three-way catalyst, occlusion-reduction type NOx catalyst may be used.

The operating conditions of the engine 1 are controlled by an engine control unit (which may be hereinafter referred to as "ECU") 20. The ECU 20 is constituted as a computer unit including a microprocessor and peripheral devices necessary for its operation such as RAM and ROM. Sensors that detect the operating conditions of the engine 1 such as a crank angle sensor 21 that outputs a signal indicating the engine rotational speed; an accelerator operation amount sensor 22 that outputs signals indicating the operation amount of the accelerator pedal 16 and a change thereof, respectively; a G-sensor 23, which functions as acceleration rate detection means, that outputs a signal indicating the rate of acceleration G in the longitudinal direction of the vehicle and a signal indicating the rate of acceleration in the vertical direction of the vehicle; the airflow meters 12, the intake pressure sensors 14 and so on are connected to the ECU 20. The ECU 20 detects the operating conditions of the engine 1 with reference to output signals from these sensors and controls the ignition timing of each spark plug 10, the opening of the throttle valves 12 (throttle opening) and so on in order to achieve target operating conditions.

Figure 2:
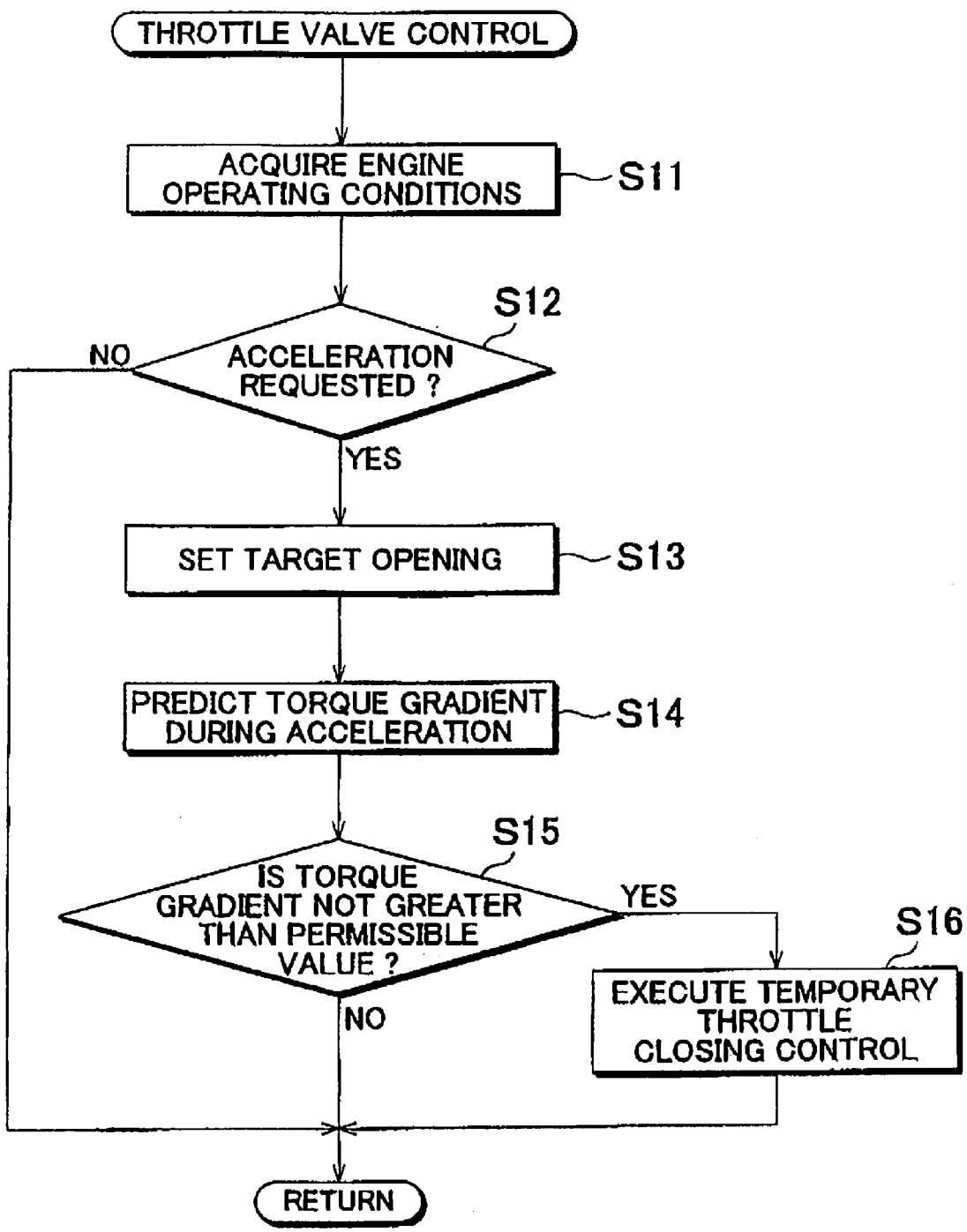
FIG. 2 is a flowchart showing a throttle valve control operation according to the first embodiment.

As one control relating to a operating condition of the engine 1, the ECU 20 executes a predetermined control to control the opening of the throttle valves 12 during acceleration of the engine 1 so that the torque gradient during the acceleration reaches a predetermined target value. When the torque gradient during acceleration is large, the torque of the engine 1 increases rapidly, in other words, the torque shows a sharp increase, but then significant acceleration shock is likely to occur. When the torque gradient during acceleration is small, no acceleration shock occurs, but the torque of the engine 1 increases slowly, in other words, the torque shows a gentle increase. Thus, the ECU 20 executes a throttle valve control operation shown in FIG. 2 to achieve a sharp torque rise and prevent an acceleration shock during acceleration of the engine 1. The control operation shown in FIG. 2 is is executed a predetermined intervals while the engine 1 is running. Because the ECU 20 executes the throttle valve control operation shown in FIG. 2, the ECU 20 functions as the operation control means of the present invention.

In the control operation shown in FIG. 2, the ECU 20 first acquires the operating conditions of the engine 1 in step S11. The ECU 20 acquires engine operating conditions such as, for example, the rotational speed, load, torque, intake air amount, intake pressure and ignition timing of the engine 1. The load of the engine 1 may be calculated based on, for example, the intake air amount. Because the torque of the engine 1 may be correlated with the rotational speed, load, intake pressure, ignition timing and so on of the engine 1, it may be calculated based on any of these parameters. The load and torque of the engine 1 may be calculated by a known method and hence detailed description of the method is omitted. Because the ECU 20 performs this process to acquire the torque of the engine 1, the ECU 20 functions as the torque acquisition means of the present invention. In the next step S12, the ECU 20 determines whether the accelerator pedal 16 is being operated to make a request for acceleration of the engine 1. If it is determined that there is no request for acceleration of the engine 1, the current control operation is terminated.

Figure 3:
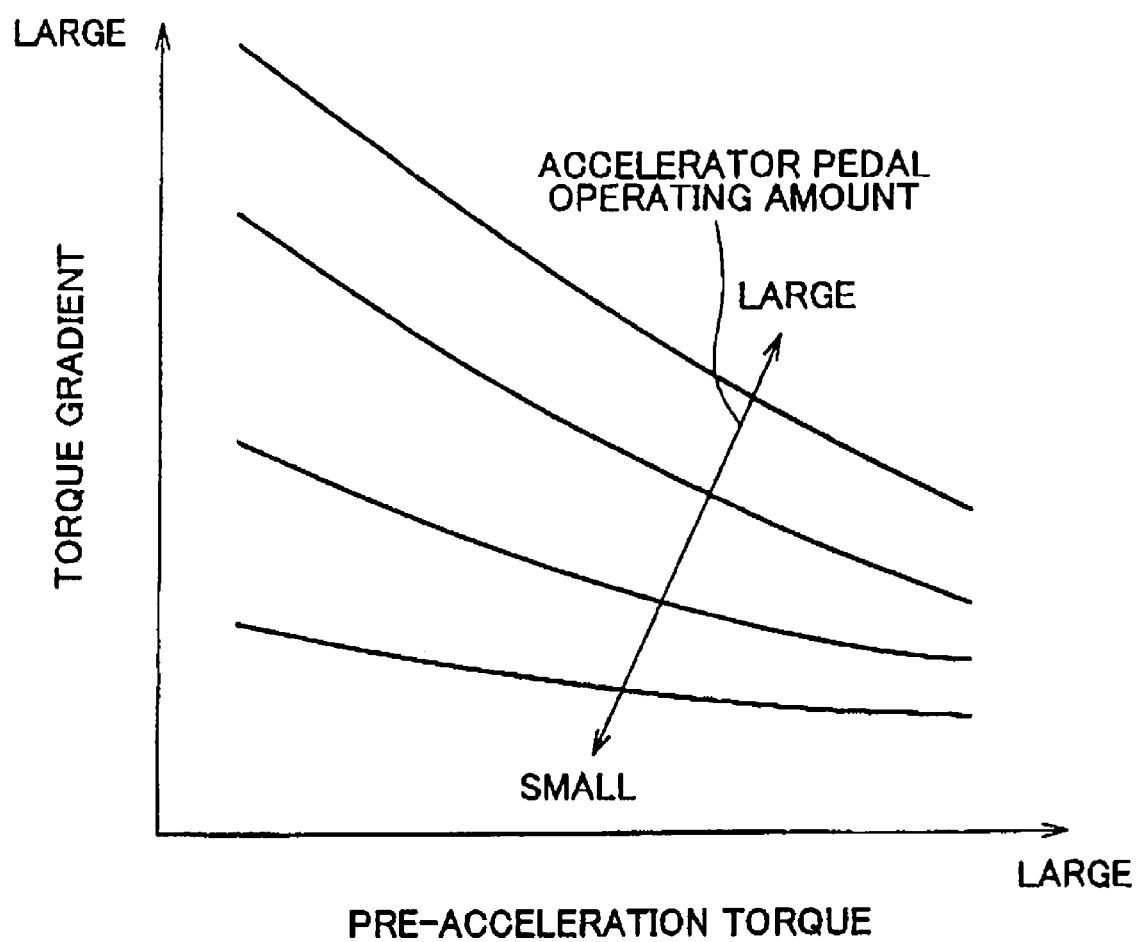
FIG. 3 is a view illustrating an example of the relation among the pre-acceleration torque, the operating amount of the accelerator pedal and the torque gradient during acceleration.

If it is determined that there is a request for acceleration of the engine 1, the operation proceeds to step S13, in which the ECU 20 sets a target opening Te for the throttle valves 13 at the end of the acceleration, based on the operating amount of the accelerator pedal 16 and the opening of the throttle valves 13 when the request for acceleration is made. Because the ECU 20 performs this process, the ECU 20 functions as the target opening setting means of the present invention. Next, in step S14, the ECU 20 predicts a torque gradient that will be obtained when the requested acceleration is carried out. The prediction of the torque gradient may be carried out with reference to a map shown in FIG. 3, for example. FIG. 3 shows an example of the relation among the torque of the engine 1 before acceleration (pre-acceleration torque), the operating amount of the accelerator pedal 16 and the torque gradient during acceleration. As shown in FIG. 3, the smaller the pre-acceleration torque is and the larger the operating amount of the accelerator pedal 16 is, the greater the torque gradient will be. The relation shown in FIG. 3 is calculated or determined empirically and stored as a map in the ROM of the ECU 20. Because the ECU 20 performs this process, the ECU 20 functions as the torque gradient prediction means of the present invention.

In the next step S15, the ECU 20 determines whether the predicted torque gradient during acceleration is equal to or below a preset predetermined permissible value. The predetermined permissible value is set as a reference value to determine whether the acceleration shock which is expected to occur during acceleration will be within a permissible range determined in view of the effect on the driver. Thus, the predetermined permissible value is set to such a torque gradient that if the torque gradient during acceleration is greater than the predetermined permissible value, an acceleration shock that exceeds the permissible range will occur. If it is determined that the predicted torque gradient during acceleration is greater than the predetermined permissible value, the current control operation is terminated.

If it is determined that the predicted torque gradient during acceleration is equal to or below the predetermined value, the operation proceeds to step S16, in which the ECU 20 executes a temporary throttle closing control in which the throttle valves 13 is temporarily controlled to the close side before it is controlled to the open side. Then, the current control operation is terminated.

Figure 4:
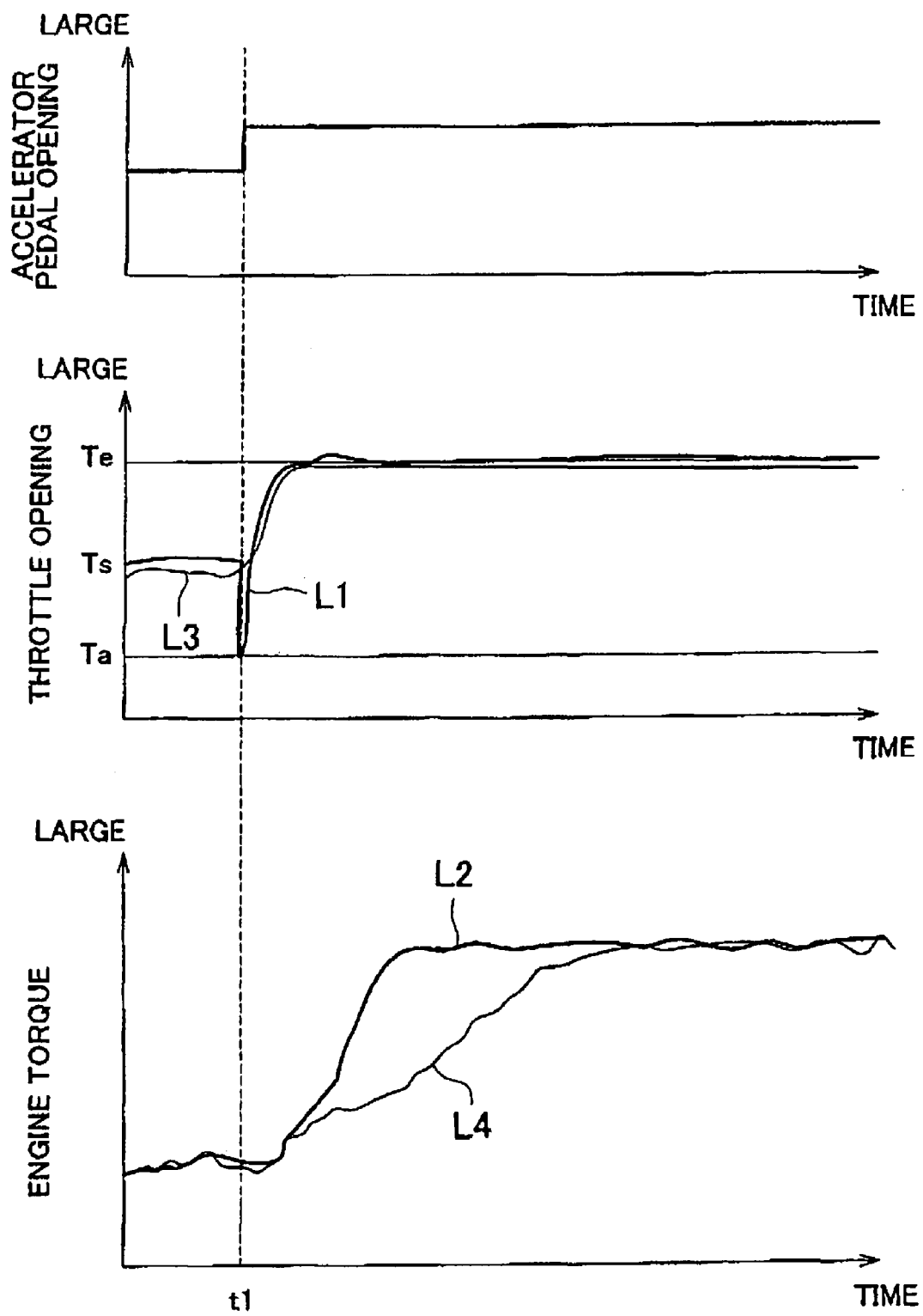
FIG. 4 is a graph showing the change over time in the accelerator pedal operation amount, the change over time in the throttle opening and the change over time in the engine torque that are obtained when a temporary throttle closing control is executed.

Referring now to FIG. 4, the change over time in the torque of the engine 1 that is achieved when the temporary throttle closing control is executed is described. FIG. 4 shows, from top to bottom, the change over time in the accelerator pedal opening, the change over time in the throttle opening, and the change over time in the torque of the engine 1. A curve L1 shows an example of the change over time in the throttle opening brought about by the temporary throttle closing control, and a curve L2 shows an example of the change over time in the torque brought about by the temporary throttle closing control. A curve L2 in FIG. 4 also represents an example of the change over time in the torque that is obtained when the torque gradient is equal to the predetermined permissible value. As comparative examples, an example of the change over time in the throttle opening that is obtained when the temporary throttle closing control is not executed is shown as a curve L3 and an example of the change over time in the torque that is obtained when the temporary throttle closing control is not executed is shown as a curve L4 in FIG. 4.

If the accelerator pedal 16 is operated to make a request for acceleration of the engine 1 at a time t1 in FIG. 4, the ECU 20 predicts a torque gradient. Because the torque gradient to be predicted at this time is a torque gradient that will be achieved without a temporary throttle closing control, the curve LA shown in FIG. 4 is predicted. Because the predicted curve L4 lies below the curve L2, which expresses the change over time in the torque that is obtained when the torque gradient is equal to the predetermined permissible value, it is determined that the predicted torque gradient is equal to or below the predetermined value and the ECU 20 executes the temporary throttle closing control. In the temporary throttle closing control, the opening amount of the throttle valves 13 is temporarily reduced from a pre-acceleration opening amount Ts to a predetermined minimum opening amount Ta and then controlled to increase until the throttle opening amount reaches a target throttle opening amount Te. As the minimum opening Ta, the throttle opening that is set when the engine 1 is idling (idle opening amount) is selected.

When a temporary throttle closing control is executed as described above, the intake pressure in the intake passages 6 downstream of the throttle valves 13 is decreased. Thus, when the throttle valves 13 are opened, a greater amount of intake air may be introduced into the combustion chambers 5 than when the temporary throttle closing control is not executed. Therefore, a sharp rise in the torque of the engine 1 may be achieved. In addition, in the example shown in FIG. 4, because the torque gradient during acceleration is controlled to follow the curve L2, expressing a change over time in the torque that is obtained when the torque gradient is equal to the predetermined permissible value by the temporary throttle closing control, acceleration shock is regulated within the permissible range. As a result, acceleration shock is prevented and the acceleration performance of the engine 1 is improved.

According to the first embodiment, because a temporary throttle closing control is executed when the predicted torque gradient during acceleration is equal to or below a predetermined value, a sharp rise in torque is achieved, which improves the acceleration performance of the engine 1. The minimum opening Ta for the temporary throttle closing control is not limited to the idle opening amount. For example, the minimum throttle opening amount Ta may be set based on the difference between the predicted torque gradient and a predetermined permissible value (which may be hereinafter referred to as "torque gradient difference"). In this case, the minimum throttle opening amount Ta is set to such a value that the torque gradient may be adjusted to the predetermined permissible value when the opening amount of the throttle valves 13 is increased from the minimum throttle opening amount Ta to the target throttle opening amount Te. The relation between the torque gradient difference and the minimum throttle opening amount Ta may be calculated or determined empirically and then stored as a map in the ROM of the ECU 20, and a minimum throttle opening amount Ta may be set with reference to the map. In this case, the ECU 20 functions as the minimum opening setting means of the present invention. Because the operation of the throttle valves 13 is controlled to adjust the intake air amount in order to control the torque of the engine 1 in the first embodiment, the intake air amount serves as the parameter of the present invention, and the throttle valves 13 functions as the parameter adjusting means of the present invention.

Figure 5:
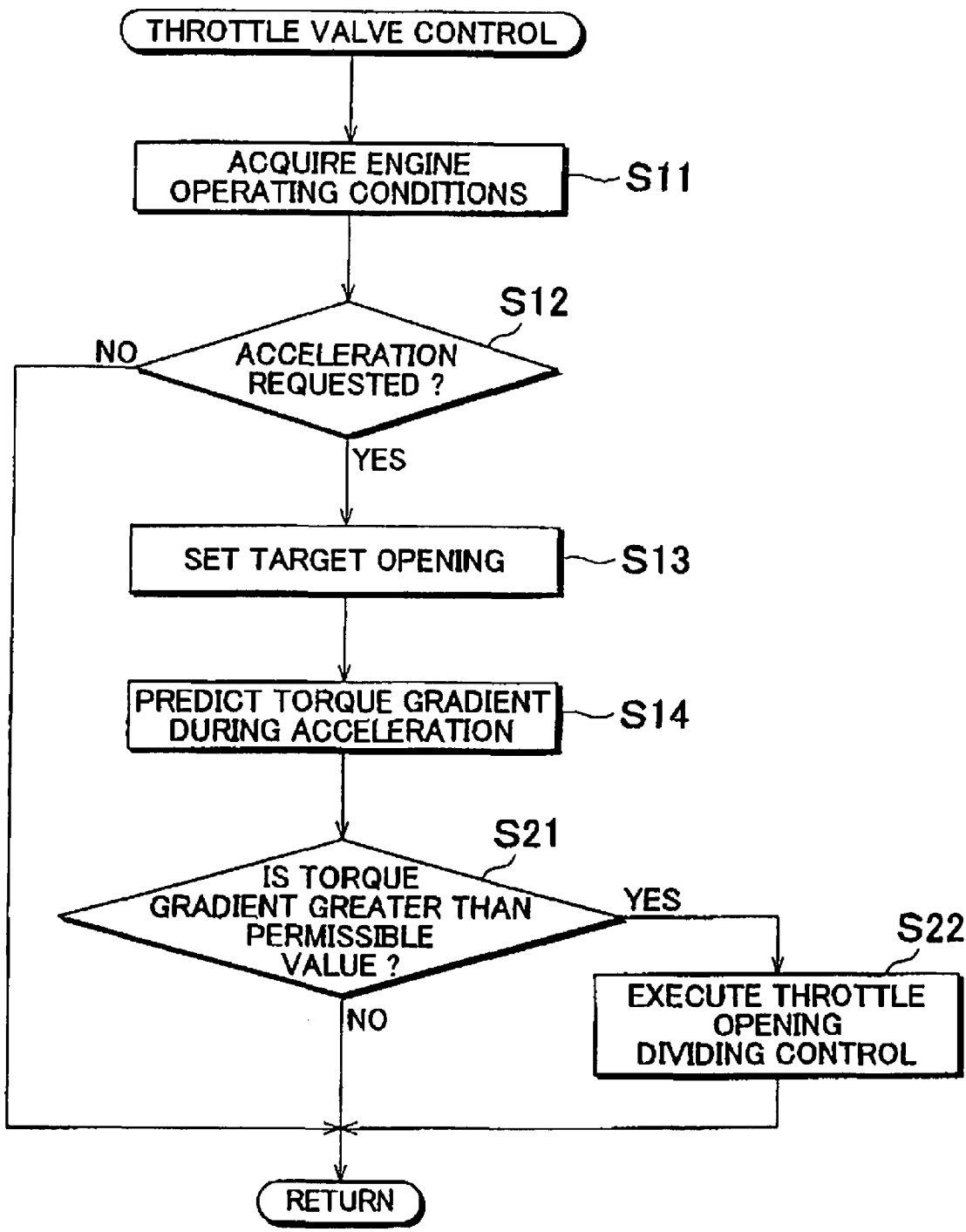
FIG. 5 is a flowchart showing a throttle valve control operation according to the second embodiment.
Figure 6:
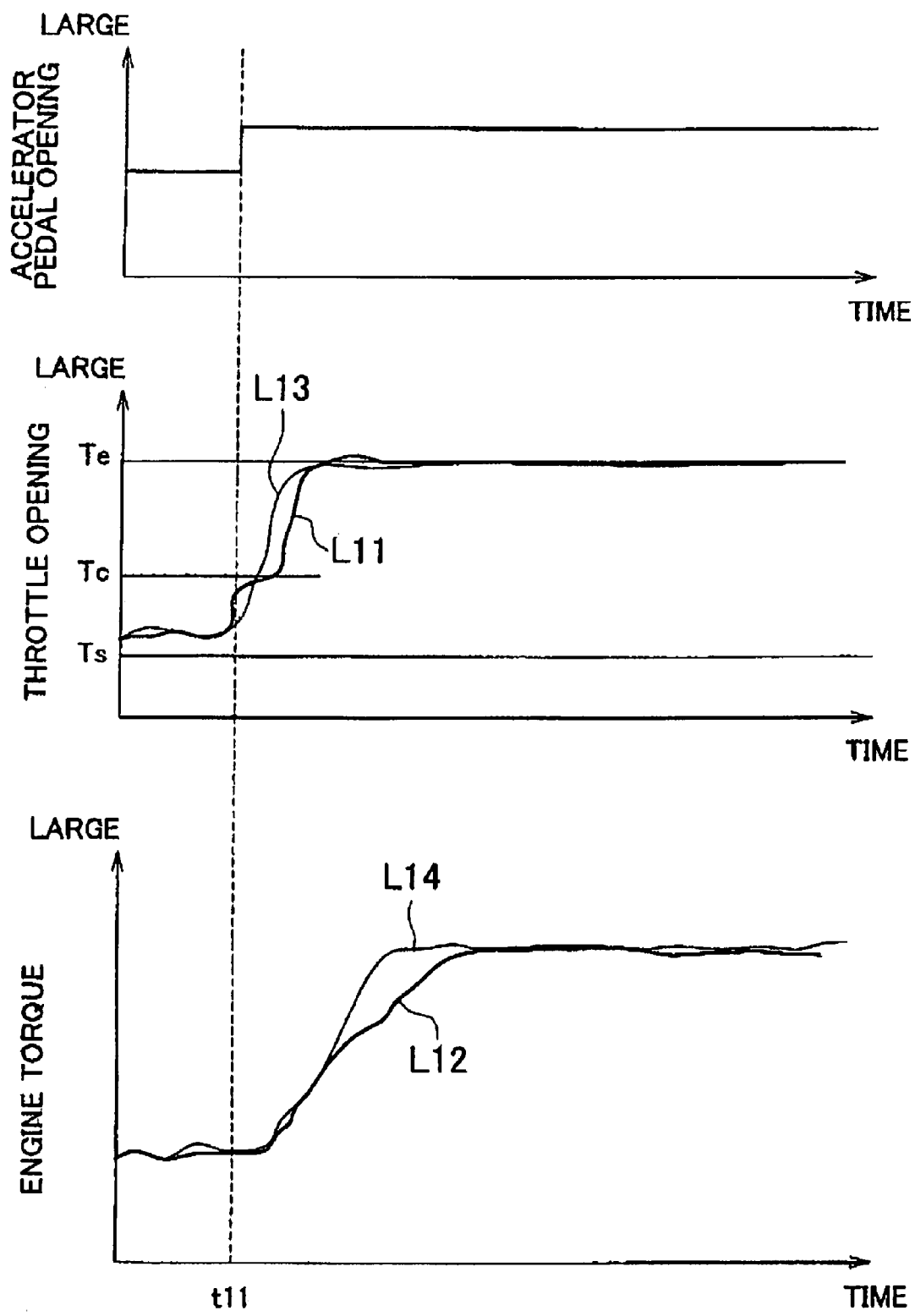
FIG. 6 is a graph showing the change over time in the accelerator pedal operation amount, the change over time in the throttle opening and the change over time in the engine torque that are obtained when a throttle opening dividing control is executed.

Referring to FIG. 5 and FIG. 6, a second embodiment of the present invention will be described. Refer to FIG. 1 about the engine 1 in the second embodiment as well. FIG. 5 shows a throttle valve control operation that is executed by the ECU 20 in the second embodiment. The control is also executed at predetermined intervals while the engine 1 is running. The same steps as those in FIG. 2 are designated by the same reference numerals in FIG. 5 and their description is omitted.

In the control operation shown in FIG. 5, the ECU 20 carries out step S11 to step S14 in the same manner as shown in FIG. 2. Next, in step S21, the ECU 20 determines whether the predicted torque gradient during acceleration is greater than a predetermined permissible value. The predetermined permissible value is the same as that used in step S15 of FIG. 2. If it is determined that the predicted torque gradient during acceleration is not greater than the predetermined permissible value, the current control operation is terminated.

If it is determined that the predicted torque gradient during acceleration is greater than the predetermined permissible value, the operation proceeds to step S22, in which the ECU 20 executes a throttle opening dividing control in which the opening of the throttle valves 13 is changed from the pre-acceleration throttle opening amount Ts to a predetermined intermediate throttle opening amount Tc and temporarily held at the opening and then changed from the intermediate opening Tc to the target opening Te during acceleration of the engine 1. Then, the current control operation is terminated.

The predetermined intermediate throttle opening amount Tc is set to an opening amount between the pre-acceleration throttle opening amount Ts and the target throttle opening amount Te and such an opening amount that the torque gradient that may be obtained when the throttle opening is changed from the pre-acceleration throttle opening amount Ts to the intermediate throttle opening amount Tc will be smaller than a predetermined value and the torque gradient that may be obtained when the throttle opening amount is changed from the intermediate throttle opening amount Tc to the target throttle opening amount Te will be smaller than a predetermined value. Such an intermediate throttle opening amount Tc has a correlation with the torque gradient difference, and the intermediate throttle opening amount Tc is set to a smaller value, that is, a value closer to the pre-acceleration throttle opening amount Ts as the torque gradient difference increases. The relation between the intermediate throttle opening amount Tc and the torque gradient difference may be calculated or determined empirically and stored as a map in the ROM of the ECU 20 and the setting of the intermediate throttle opening amount Tc may be made with reference to the map.

Referring now to FIG. 6, the change over time in the torque of the engine 1 that is achieved when the throttle opening dividing control is executed is described. FIG. 6 shows, from top to bottom, the change over time in the accelerator pedal opening, the change over time in the throttle opening amount, and the change over time in the torque of the engine 1. A curve L11 shows an example of the change over time in the throttle opening amount brought about by the throttle opening dividing control, and a curve L12 shows an example of the change over time in the torque brought about by the throttle opening dividing control. A curve L12 in FIG. 6 also represents an example of the change over time in the torque that is obtained when the torque gradient is equal to the predetermined value. As comparative examples, an example of the change over time in the throttle opening amount that is obtained when the throttle opening dividing control is not executed as a curve L13 and an example of the change over time in the torque which is obtained when the throttle opening dividing control is not executed as a curve L14 in FIG. 6.

When the accelerator pedal 16 is operated to make a request for acceleration of the engine 11 at a time t11 in FIG. 6, the ECU 20 predicts a torque gradient. Because the torque gradient to be predicted at this time is a torque gradient that will be achieved without the execution of a throttle opening dividing control, the curve L14 shown in FIG. 6 is predicted. Because the predicted curve L4 lies above the curve L12 expressing the change over time in the torque which is obtained when the torque gradient is equal to the predetermined value, it is determined that the predicted torque gradient is greater than the predetermined value and the ECU 20 executes the throttle opening dividing control. In the throttle opening dividing control, the throttle valves 13 are first opened from the pre-acceleration throttle opening amount Ts to the intermediate throttle opening amount Tc and held temporarily at the opening amount as described above. Then, the throttle valves 13 are opened further from the intermediate throttle opening amount Tc to the target throttle opening amount Te.

When a throttle opening dividing control is executed as described above to hold the throttle valves 13 temporarily at the intermediate throttle opening amount Tc during acceleration of the engine 1, the pressure difference between upstream and downstream of the throttle valves 13 is decreased. Thus, the degree of increase in the intake air with an increase in the opening amount of the throttle valves 13 may be decreased appropriately, whereby the torque gradient is decreased appropriately. Therefore, the torque of the engine 1 may be decreased. As a result, the change over time in the torque during acceleration is made to follow the curve L12 in FIG. 7. Thus, an excessive increase in the torque of the engine 1 may be prevented and the torque gradient is adjusted to a predetermined value.

According to the second embodiment, because a throttle opening dividing control is executed to adjust the torque gradient to a predetermined value when the predicted torque gradient during acceleration is equal to or exceeds a predetermined value, acceleration shock may be prevented. Also, because the change over time in torque during acceleration may be adjusted to follow the curve L12 shown in FIG. 8, an unnecessary reduction in torque during acceleration is prevented, resulting in a sharp torque rise. Because the operation of the throttle valves 13 is also controlled to adjust the intake air amount in order to control the torque of the engine 1 in the second embodiment, the intake air amount may be regarded as the parameter of the present invention, and the throttle valves 13 may be regarded as the parameter adjusting means of the present invention.

Figure 7:
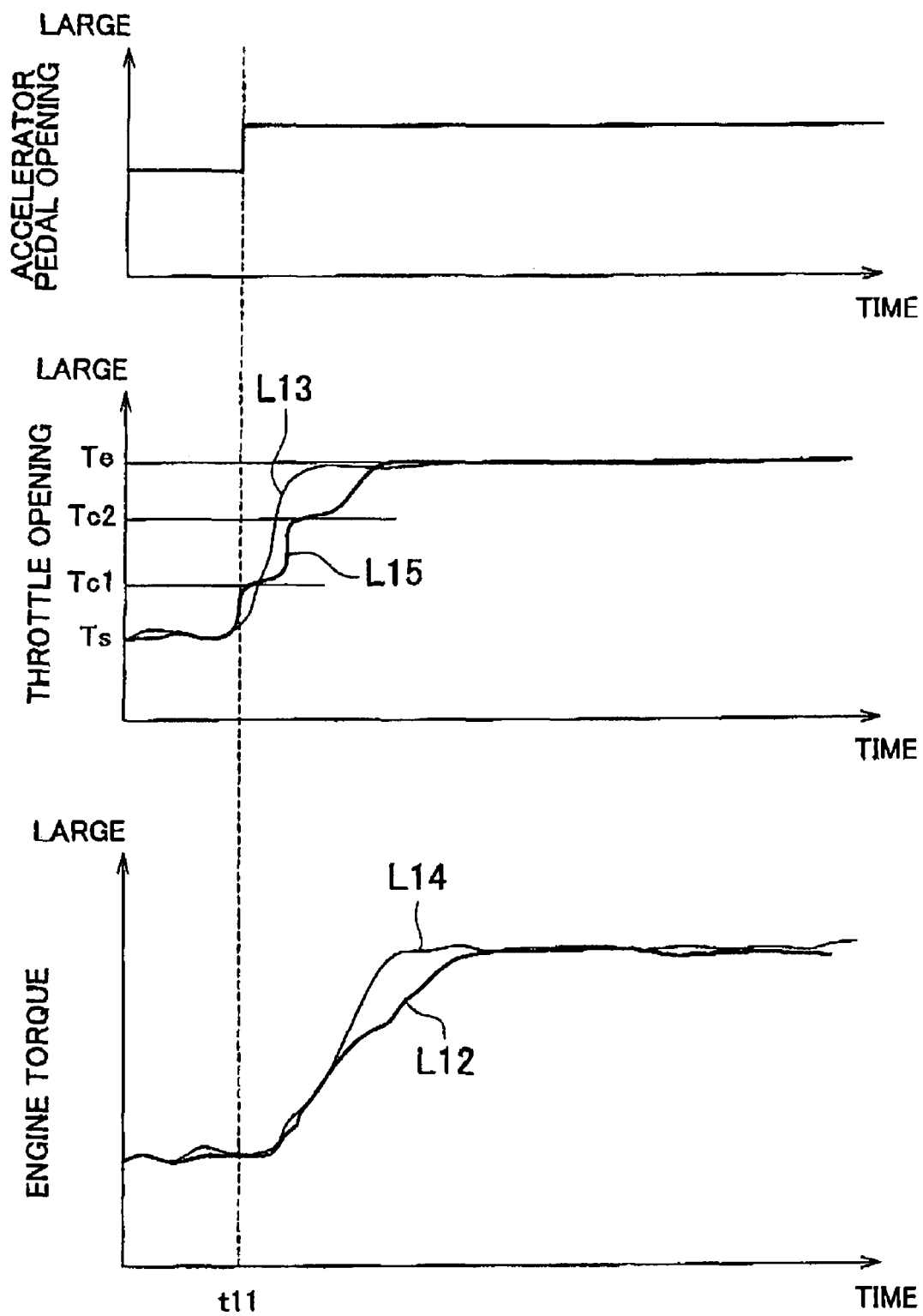
FIG. 7 is a view for explaining a modification of the throttle opening dividing control.

Referring to FIG. 7, a modification of the throttle opening dividing control is described. The same parts as those in FIG. 6 are designated by the same reference numerals in FIG. 7 and their description is omitted. Although the throttle valves are held temporarily at one intermediate throttle opening amount Tc during the throttle opening dividing control in the example shown in FIG. 6, the throttle valves may be held at two or more throttle opening amounts in the throttle opening dividing control. For example, as shown by a curve L15 in FIG. 7, the throttle opening amount may be held temporarily at a first intermediate throttle opening amount Tc1 and then at a second intermediate throttle opening amount Tc2 between the first intermediate throttle opening amount Tc1 and the target throttle opening amount Te before the throttle is opened to the target throttle opening amount Te in the throttle opening dividing control. In this modification, the ECU 20 predicts a torque gradient that will be obtained when the throttle opening amount is changed from the first intermediate throttle opening amount Tc1 to the target throttle opening amount Te (interim torque gradient) while the throttle opening amount is temporarily held at the first intermediate throttle opening amount Tc1, and the throttle opening amount is held temporarily at the second intermediate throttle opening amount Tc2 if the predicted interim torque gradient is equal to or exceeds a predetermined value. Because an interim torque gradient is predicted and the throttle valves 13 are controlled based on the predicted interim torque gradient in the throttle opening dividing control, the change over time in the torque during acceleration follows the curve L12 shown in FIG. 7 more reliably. As a result, acceleration shock may be prevented more reliably. Because the ECU 20 predicts an interim torque gradient, the ECU 20 may be regarded as interim torque gradient prediction means of the present invention.

In addition, the torque gradient that is obtained when the throttle opening amount is changed from the second intermediate throttle opening amount Tc2 to the target throttle opening amount Te may be predicted while the throttle opening is held at the second intermediate throttle opening amount Tc2 and the throttle opening amount may be held temporarily again at a third intermediate opening amount between the second intermediate throttle opening amount Tc2 and the target throttle opening amount Te based on the result of the prediction. As described above, every time the throttle opening amount is temporarily held at an opening between the pre-acceleration throttle opening amount Ts and the target throttle opening amount Te, a torque gradient which will be obtained when the throttle opening amount is changed from the current opening to the target throttle opening amount Te may be predicted and the throttle opening amount may be held temporarily again at a third intermediate opening amount between the current throttle opening amount and the target throttle opening amount Te based on the result of the prediction. In this case, the change over time in the torque during acceleration follows the curve L12 shown in FIG. 7 much more reliably.

Figure 8:
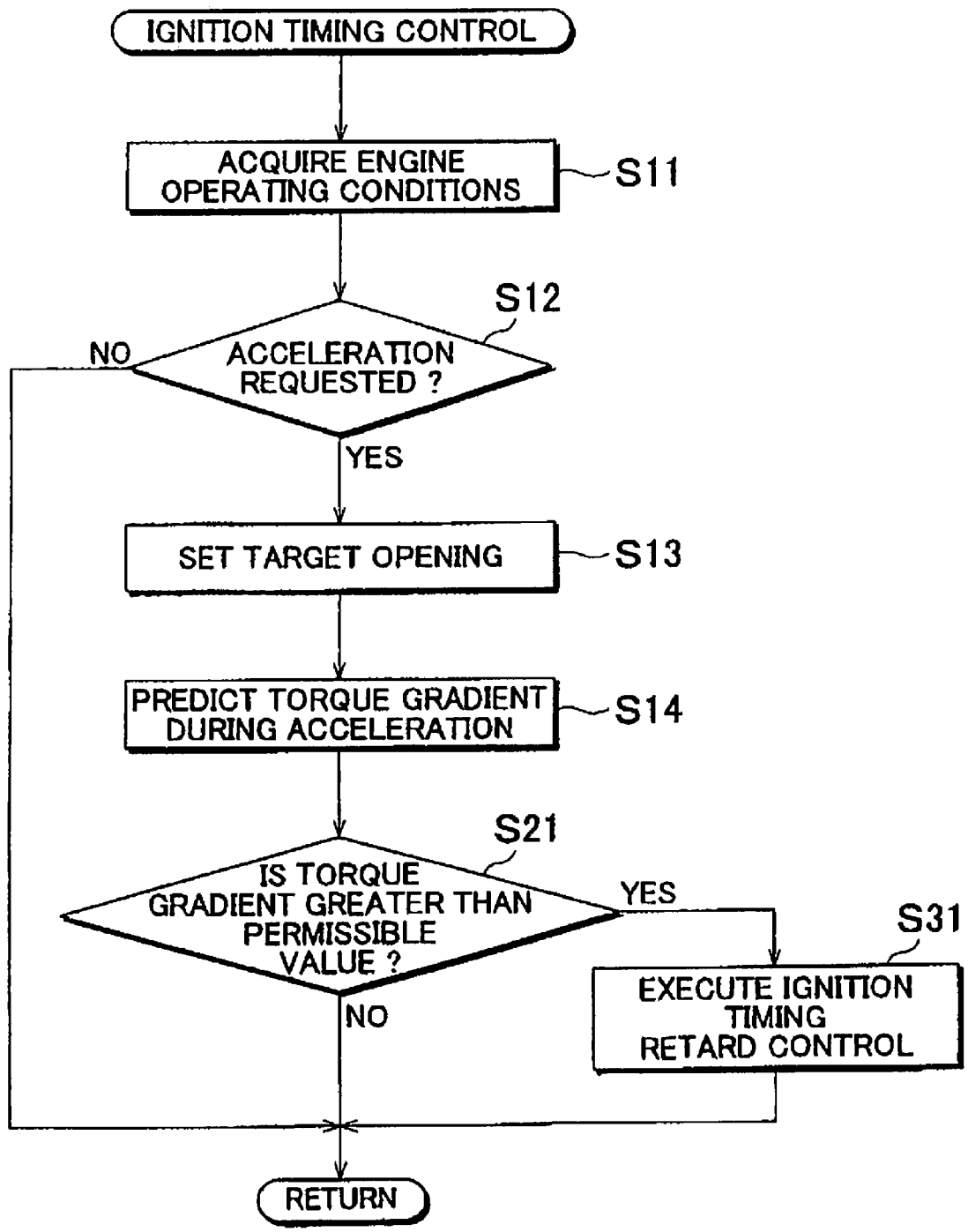
FIG. 8 is a flowchart showing an ignition timing control operation according to the third embodiment.
Figure 9:
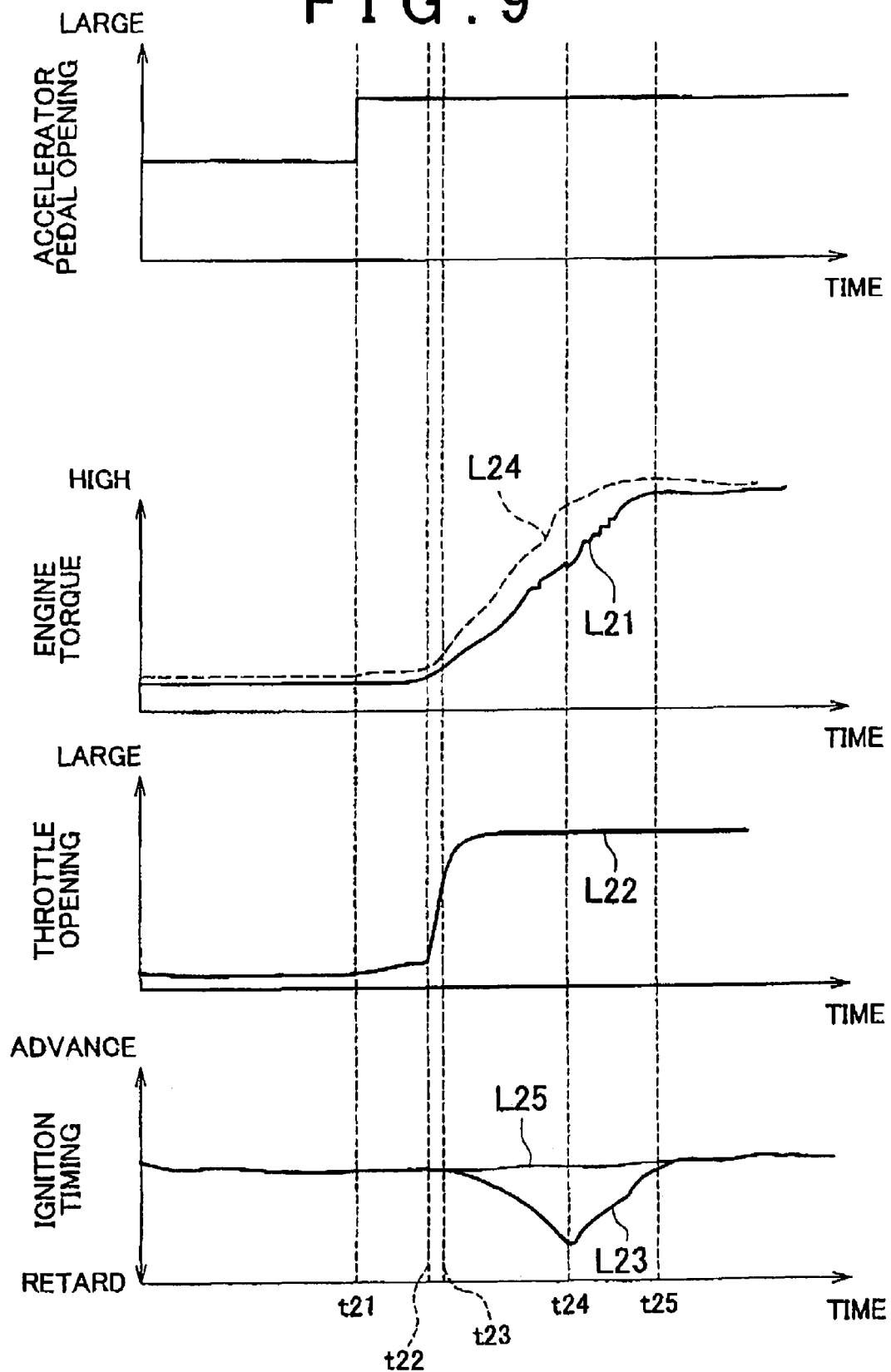
FIG. 9 is a graph showing the change over time in the accelerator pedal operation amount, the change over time in the engine torque, the change over time in the throttle opening, and the change over time in ignition timing that are obtained when an ignition timing retard control is executed.

Referring to FIG. 8 and FIG. 9, a third embodiment of the present invention will be described. Refer to FIG. 1 about the engine 1 in this embodiment as well. The third embodiment differs from the other embodiments in that when the predicted torque gradient during acceleration is equal to or exceeds a predetermined value, the ignition timing is controlled to control the torque of the engine 1. FIG. 8 shows an ignition timing control operation of the third embodiment that is executed by the ECU 20 at predetermined intervals while the engine 1 is running. The same steps as those in FIG. 2 and FIG. 5 are designated by the same reference numerals in FIG. 8 and their description is omitted.

In the control operation shown in FIG. 8, the ECU 20 carries out step S11 to step S21 in the same manner as shown in FIG. 5. If it is determined that the torque gradient during acceleration predicted in step S21 is not greater than the predetermined permissible value, the current control operation is terminated. If it is determined that the predicted torque gradient during acceleration is greater than the predetermined permissible value, the operation proceeds to step S31, in which the ECU 20 executes an ignition timing retard control so that the ignition timing of the spark plugs 10 is retarded during acceleration. Then, the current control operation is terminated.

Referring to FIG. 9, the ignition timing retard control is described in detail. FIG. 9 shows, from top to bottom, the change over time in the accelerator operation amount, the change over time in the torque of the engine 1, the change over time in the throttle opening amount, and the change over time in the ignition timing. A curve L21 shows an example of the change over time in the torque controlled by the ignition timing retard control, a curve L22 shows an example of the change over time in the throttle opening amount, and a curve L23 shows an example of the change over time in the ignition timing brought about by the ignition timing retard control. A curve L21 in FIG. 9 also represents an example of the change over time in the torque that is obtained when the torque gradient is equal to the predetermined value. As comparative examples, an example of the change over time in the torque which is obtained when the ignition timing retard control is not executed as a curve L24 and an example of the change over time in the ignition timing that is obtained when the ignition timing retard control is not executed as a curve L25 in FIG. 6.

Figure 10:
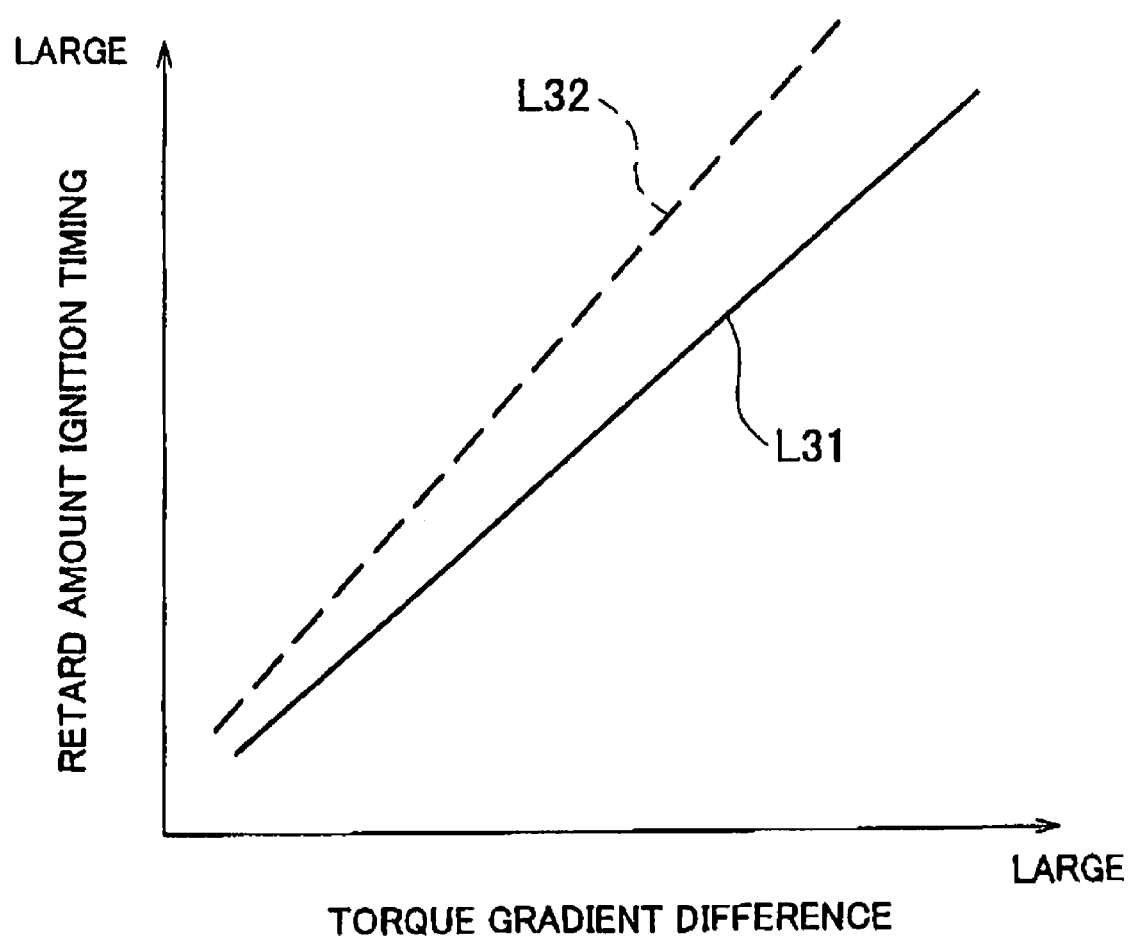
FIG. 10 is a view illustrating an example of the relation between the torque gradient difference and the ignition timing retard amount.

When the accelerator pedal 16 is operated to make a request for acceleration of the engine 1 at a time t21 in FIG. 9, the ECU 20 predicts a torque gradient at time t22. Because the torque gradient to be predicted at this time is a torque gradient that is achieved without an ignition timing delaying control, the curve L24 shown in FIG. 9 is predicted. Because the predicted curve L24 lies above the curve L21 expressing the change over time in the torque that is obtained when the torque gradient is equal to the predetermined value, it is determined that the predicted torque gradient is equal to or exceeds the predetermined value, and an ignition timing retard control is started at a time t23. In the ignition timing retard control, the ignition timing is retarded in accordance with the torque gradient difference. The degree to which the ignition timing is retarded may be set based on a relation between the torque gradient difference and the degree of ignition timing delay shown by a solid line curve L31 in FIG. 10. A relation as shown by the solid line curve 131 in FIG. 10 may be calculated or determined empirically and stored as a map in the ROM of the ECU 20 in advance. In this case, the ECU 20 can be regarded as the storage means of the present invention. As shown in FIG. 10, the greater the torque gradient difference, the more the ignition timing is retarded. Thus, at a time t24, when the torque gradient difference reaches its maximum value, the retardation of the ignition timing is at a maximum. After that, the ignition timing is gradually advanced to the ignition timing before acceleration, and the ignition timing retard control is completed at a time t25 when the acceleration is completed.

As is well known, the more the ignition timing is retarded, the more the torque of the engine 1 decreases. Thus, when it is determined that the torque gradient is equal to or exceeds the predetermined value, the torque during acceleration may be adjusted to follow the curve L21 in FIG. 9 by retarding the ignition timing in accordance with the torque gradient difference.

According to the third embodiment, because the ignition timing is retarded to reduce the torque output during acceleration when the predicted torque gradient during acceleration is equal to exceeds a predetermined value, an acceleration shock can be prevented. Because the operation of the spark plugs 10 is controlled to adjust the ignition timing in order to control the torque of the engine 1 in the third embodiment, the ignition timing may be regarded as the parameter of the present invention and the spark plugs 10 may be regarded as the parameter adjusting means of the present invention.

Because the engine 1 undergoes age-related deterioration, when the engine 1 has been used for a relatively long period, the torque may decrease insufficiently or excessively even if the ignition timing is retarded to the same degree as that which was effective when the engine 1 was new. Thus, when an ignition timing retard control is executed during acceleration, the relation between the torque gradient difference and the retard amount may be corrected based on the rate of acceleration of the vehicle with reference to an output signal from the G-sensor 23 at that time. For example, if the rate of acceleration G in the longitudinal direction of the vehicle increases and the acceleration shock exceeds the permissible range when an ignition timing retard control is executed, it is considered that the degree of the delay in the ignition timing is insufficient. In such a case, the relation shown by the solid line curve L31 in FIG. 10 is corrected to the broken line curve L32. By correcting the relation as described above, the torque during acceleration may be appropriately decreased even when the engine 1 has deteriorated over time. As a result, an acceleration shock can be prevented properly. Since the ECU 20 corrects the relation shown in FIG. 10, the ECU 20 can be regarded as the correction means of the present invention.

The present invention is not limited to the embodiments described above and may be implemented in various ways. For example, the internal combustion engine to which the present invention is applied is not limited to a spark ignition internal combustion engine. The present invention may be applied to a diesel internal combustion engine. The present invention may be also applied to a direct-injection internal combustion engine in which fuel is directly injected into the cylinders and a port-injection internal combustion engine in which fuel is injected into the intake ports. The parameter to be controlled to reduce the torque of the engine during acceleration is not limited to the intake air amount or the ignition timing. For example, any of various parameters which have an effect on the torque of the engine such as the fuel injection amount, the valve opening or closing timing of the intake valves or the exhaust valves may be controlled to control the torque during acceleration.

The correction of the control during acceleration based on an output signal from the G-sensor 23 may be made to the temporary throttle closing control or the throttle opening dividing control. For example, in the temporary throttle closing control, the minimum throttle opening amount may be corrected based on an output signal from the G-sensor 23. In the throttle opening dividing control, the intermediate throttle opening amount may be corrected based on an output signal from the G-sensor 23. These corrections are also made in such a way as to compensate for the effect of the age related deterioration of the engine as in the case with the correction of the ignition timing retard control described in the third embodiment.

Figure 11:
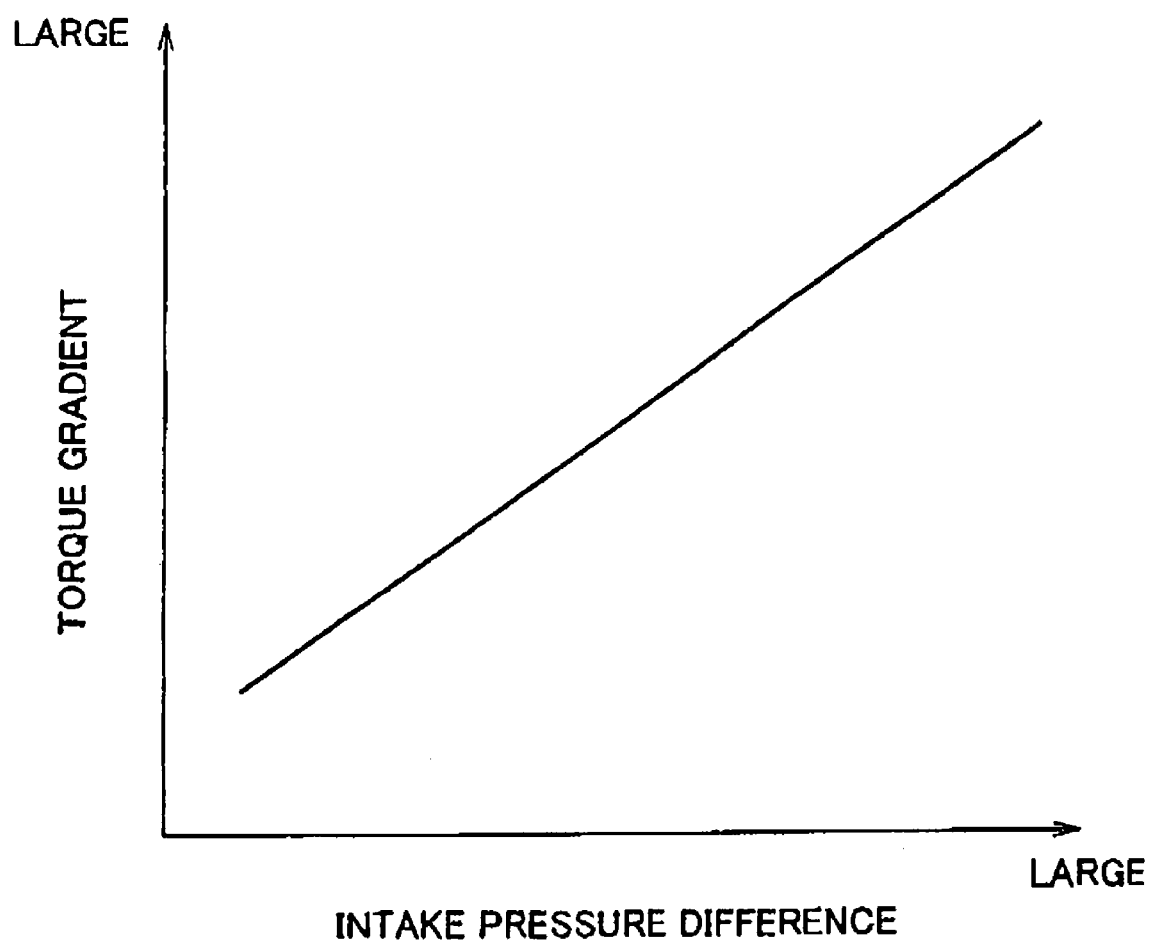
FIG. 11 is a view illustrating an example of the relation between the intake pressure difference and the torque gradient.

Although the torque gradient during acceleration is predicted based on the torque of the engine and the operating amount of the accelerator pedal before the acceleration in the embodiments described above, the method for predicting the torque gradient is not limited to this method. For example, the intake pressure also has a correlation with the torque gradient. For example, it is believed that the greater the difference between the intake pressure at the end of acceleration and the intake pressure before the acceleration (which may be hereinafter referred to as "intake pressure difference") is, the greater the degree of the torque to be increased during the acceleration is, that is, the greater the torque gradient will be. Thus, a relation between the intake pressure difference and the torque gradient as shown in FIG. 11 may be calculated or determined empirically and stored as a maps in the ROM of the ECU 20 and the torque gradient may be predicted with reference to the map. The intake pressure difference may be obtained by estimating the intake pressure at the end of acceleration based on the intake pressure and the operating amount of the accelerator pedal before the acceleration and subtracting the intake pressure before the acceleration from the estimated intake pressure.

Figure 12:
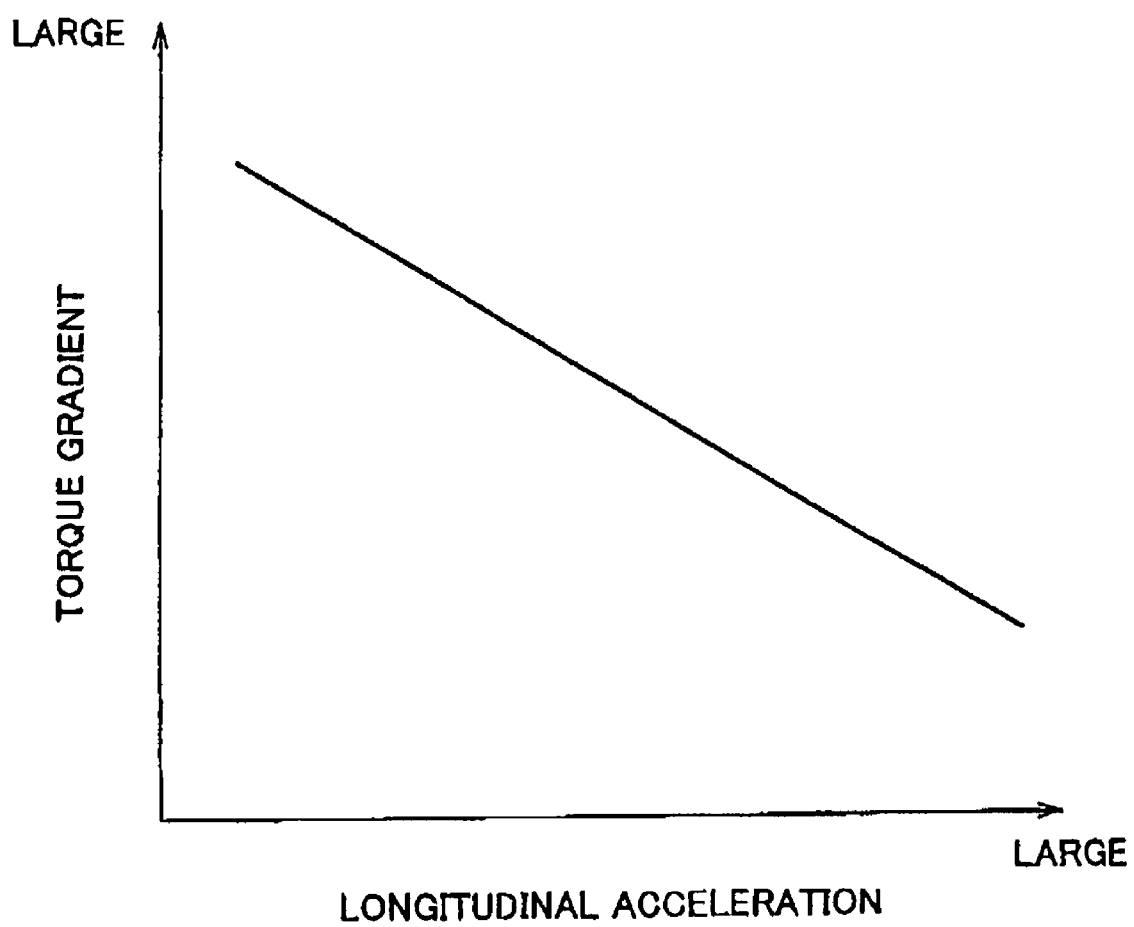
FIG. 12 is a view illustrating an example of the relation between the rate of acceleration G in the longitudinal direction and the torque gradient.

The torque gradient may be predicted based on the rate of acceleration G in the longitudinal direction of the vehicle. For example, because it can be estimated that the engine is already running at a high rotational speed and high output when the rate of acceleration G is already large before further acceleration, it can be predicted that the torque gradient will be small. Thus, the relation between the rate of acceleration G in the longitudinal direction and the torque gradient, as shown in FIG. 12, may be calculated or determined empirically and stored as a map in the ROM of the ECU 20 and the torque gradient may be predicted based on an output signal from the G-sensor 23 and the map. Because the rate of acceleration G may be changed depending on the gradient of the road on which the vehicle is traveling, the effect of the road should be taken into account. For example, if the vehicle is climbing a hill, the lower rate of acceleration will be detected. Thus, the gradient of the road on which the vehicle is traveling is estimated based on the rate of acceleration in the vertical direction of the vehicle and the rate of acceleration G in the longitudinal direction of the vehicle, and the rate of acceleration G is corrected based on the road gradient.

When the torque gradient during acceleration is predicted based on the torque of the engine and the operating amount of the accelerator pedal before the acceleration, the torque of the engine before the acceleration may be calculated based on an output signal from the G-sensor 23. The torque of the engine 1 is correlated to the driving force transmitted to the wheels, and the wheel driving force FT may be expressed as Equation (1) using the rate of acceleration G, the weight m of the vehicle, the travel resistance FRL on the vehicle, the gravitational acceleration g and the slope angle θ of the road in the traveling direction of the vehicle. Because the travel resistance FRL may be correlated to the vehicle speed, the travel resistance may be calculated based on the vehicle speed. The slope angle θ can be estimated based on the rate of acceleration in the vertical direction of the vehicle and the rate of acceleration G in the longitudinal direction of the vehicle.

$$FT=mG+FRL+mg\times\sin\theta \quad (1)$$

When the wheel driving force FT is calculated using Equation (1) and the torque of the engine 1 before acceleration is estimated based on the wheel driving force FT, the torque of the engine 1 based on the slope angle θ can be acquired. Thus, the degree of accuracy in predicting the torque gradient during acceleration is improved. The rate of acceleration G in the longitudinal direction of the vehicle may be obtained based on an output signal from a wheel speed sensor, instead of the G-sensor 23, that is attached to a wheel to detect the speed of the wheel.

The invention claimed is:

1. A method for controlling an internal combustion engine, comprising:
predicting, when a request for acceleration of the internal combustion engine is made, a torque gradient during the acceleration, based on an operating condition of the internal combustion engine before the acceleration, and
adjusting an air intake amount that affects the torque of the internal combustion engine based on the predicted torque gradient during the acceleration of the internal combustion engine such that, if the predicted torque gradient is equal to or below a predetermined value, then a throttle valve is adjusted to reduce a throttle opening amount at start of the acceleration of the internal combustion engine and then adjusted to increase the throttle opening amount.

2. An internal combustion engine control, comprising:
a parameter adjusting device that adjusts a parameter that affects the torque of the internal combustion engine;
a torque gradient prediction device that predicts, when a request for acceleration of the internal combustion engine is made, a torque gradient during the acceleration, based on an operating condition of the internal combustion engine before the acceleration, and
a operation control device that controls the operation of the parameter adjusting device during the acceleration of the internal combustion engine based on the torque gradient predicted by the torque gradient prediction device, wherein
the parameter is an intake air amount and the parameter adjusting device is a throttle valve, and
when the torque gradient predicted by the torque gradient prediction device is equal to or below a predetermined value, the operation control device temporarily controls the throttle valve to reduce a throttle opening amount at start of the acceleration of the internal combustion engine and then to increase the throttle opening amount.

3. The control device according to claim 2,
wherein the operation control device reduces the throttle opening amount to an idle opening amount when the throttle valve is temporarily controlled to reduce the throttle opening amount during the acceleration of the internal combustion engine.

4. The control device according to claim 2, further comprising:
a minimum throttle opening amount setting device that sets a minimum throttle opening amount based on the difference between the torque gradient predicted by the torque gradient prediction device and the predetermined permissible value,
wherein the operation control device reduces the throttle opening amount to the minimum throttle opening amount when the throttle valve is temporarily controlled to reduce the throttle opening amount during the acceleration of the internal combustion engine.

5. The control device according to claim 2,
wherein the internal combustion engine is mounted in a vehicle,
the control device further comprises an acceleration rate detection device that detects a rate of acceleration in the longitudinal direction of the vehicle, and
the operation control device comprises a storage device that stores a map of the relation between the torque gradient predicted by the torque gradient prediction device and the extent to which the operation control device controls the parameter adjusting device during acceleration of the internal combustion engine, and a correction device that corrects the map stored in the storage device, based on the detected rate of acceleration, when the operation control device controls the operation of the parameter adjusting device during acceleration of the internal combustion engine based on the torque gradient predicted by the torque gradient prediction device.

6. The control device according to claim 5, further comprising:
a torque acquisition device that acquires torque of the internal combustion engine,
wherein the torque gradient prediction device predicts a torque gradient based on the operating amount of an accelerator pedal of the internal combustion engine and the acquired torque when the request for acceleration of the internal combustion engine is made.

7. The control device according to claim 6, wherein
the torque acquisition device acquires the torque of the internal combustion engine from the detected rate of acceleration.

8. The control device according to claim 5, further comprising:
an intake pressure acquisition device that acquires an intake pressure of the internal combustion engine,
wherein the torque gradient prediction device estimates the intake pressure of the internal combustion engine at the end of the acceleration based on the operating amount of an accelerator pedal when the request for acceleration of the internal combustion engine is made, and predicts a torque gradient based on the estimated intake pressure and the acquired intake pressure when the request for acceleration of the internal combustion engine is made.

9. The control device according to claim 5,
wherein the torque gradient prediction device predicts a torque gradient based on the operating amount of an accelerator pedal of the internal combustion engine and the rate of acceleration detected by the acceleration rate detection device when the request for acceleration of the internal combustion engine is made.

10. The control device according to claim 2, further comprising:
a torque acquisition device that acquires torque of the internal combustion engine,
wherein the torque gradient prediction device predicts a torque gradient based on the operating amount of an accelerator pedal of the internal combustion engine and the acquired torque when the request for acceleration of the internal combustion engine is made.

11. The control device according to claim 2, further comprising:
an intake pressure acquisition device that acquires an intake pressure of the internal combustion engine,
wherein the torque gradient prediction device estimates the intake pressure of the internal combustion engine at the end of the acceleration based on the operating amount of an accelerator pedal when the request for acceleration of the internal combustion engine is made, and predicts a torque gradient based on the estimated intake pressure and the acquired intake pressure when the request for acceleration of the internal combustion engine is made.

12. The control device according to claim 2,
wherein the internal combustion engine is mounted in a vehicle,
the control device further comprises first acceleration rate detection device that detects a rate of acceleration in the longitudinal direction of the vehicle, and
wherein the torque gradient prediction device predicts a torque gradient based on the operating amount of an accelerator pedal of the internal combustion engine and the detected rate of acceleration when the request for acceleration of the internal combustion engine is made.

13. The control device according to claim 12, wherein the control device further comprises:
a second acceleration rate detection device that detects a rate of acceleration in the vertical direction of the vehicle, and
wherein a road gradient is estimated based on the detected rate of acceleration in the vertical direction and the detected rate of acceleration in the longitudinal direction of the vehicle and corrects the detected rate of acceleration in the longitudinal direction of the vehicle based on the estimated road gradient.

14. An internal combustion engine control, comprising:
a parameter adjusting device that adjusts a parameter that affects the torque of the internal combustion engine;
a torque gradient prediction device that predicts, when a request for acceleration of the internal combustion engine is made, a torque gradient during the acceleration, based on an operating condition of the internal combustion engine before the acceleration, and
a operation control device that controls the operation of the parameter adjusting device during the acceleration of the internal combustion engine based on the torque gradient predicted by the torque gradient prediction device, wherein
the parameter is an intake air amount and the parameter adjusting device is a throttle valve,
the control device further comprises target throttle opening amount setting device that sets a target throttle opening amount when the request for acceleration of the internal combustion engine is made, and
when the torque gradient predicted by the torque gradient prediction device is greater than a predetermined permissible value, the operation control device first holds the throttle valve temporarily at a first intermediate throttle opening amount which is greater than the throttle opening amount at the start of the acceleration and smaller than the target throttle opening amount, and then controls the throttle valve to increase the throttle opening amount during the acceleration of the internal combustion engine.

15. The control device according to claim 14 wherein
the torque gradient prediction device includes an interim torque gradient prediction device that predicts a torque gradient that will be obtained when the throttle valve is adjusted from the first intermediate throttle opening amount to the target throttle opening amount while the throttle valve is being held at the first intermediate throttle opening amount, and
when the torque gradient predicted by the interim torque gradient prediction device is greater than the permissible value, the operation control device holds the throttle valve temporarily at a second intermediate throttle opening amount, which is greater than the first intermediate throttle opening amount and smaller than the target throttle opening amount, before adjusting the throttle valve to the target throttle opening amount.

16. The control device according to claim 14,
wherein the internal combustion engine is mounted in a vehicle,
the control device further comprises an acceleration rate detection device that detects a rate of acceleration in the longitudinal direction of the vehicle, and
the operation control device comprises a storage device that stores a map of the relation between the torque gradient predicted by the torque gradient prediction device and the extent to which the operation control device controls the parameter adjusting device during acceleration of the internal combustion engine, and a correction device that corrects the map stored in the storage device, based on the detected rate of acceleration, when the operation control device controls the operation of the parameter adjusting device during acceleration of the internal combustion engine based on the torque gradient predicted by the torque gradient prediction device.

17. An internal combustion engine control, comprising:
a parameter adjusting device that adjusts a parameter that affects the torque of the internal combustion engine;
a torque gradient prediction device that predicts, when a request for acceleration of the internal combustion engine is made, a torque gradient during the acceleration, based on an operating condition of the internal combustion engine before the acceleration, and
a operation control device that controls the operation of the parameter adjusting device during the acceleration of the internal combustion engine based on the torque gradient predicted by the torque gradient prediction device, wherein
the torque gradient is a change in torque of the internal combustion engine per unit time during the acceleration of the internal combustion engine,
the internal combustion engine is a spark ignition internal combustion engine,
the parameter is ignition timing and the parameter adjusting device is an ignition device, and
when the torque gradient predicted by the torque gradient prediction device is greater than a predetermined permissible value, the operation control device controls the operation of the ignition device to retard the ignition timing in accordance with the difference between the torque gradient predicted by the torque gradient prediction device and the permissible value.

18. The control device according to claim 17,
wherein the operation control device controls the operation of the ignition device such that the ignition timing is further retarded as the difference between the predicted torque gradient and the permissible value increases.

19. The control device according to claim 17,
wherein the internal combustion engine is mounted in a vehicle,
the control device further comprises an acceleration rate detection device that detects a rate of acceleration in the longitudinal direction of the vehicle, and
the operation control device comprises a storage device that stores a map of the relation between the torque gradient predicted by the torque gradient prediction device and the extent to which the operation control device controls the parameter adjusting device during acceleration of the internal combustion engine, and a correction device that corrects the map stored in the storage device, based on the detected rate of acceleration, when the operation control device controls the operation of the parameter adjusting device during acceleration of the internal combustion engine based on the torque gradient predicted by the torque gradient prediction device.

* * * * *